Jan. 9, 1945.　　　K. M. MOODY　　　2,366,747
CABLE CONNECTOR
Filed July 19, 1943
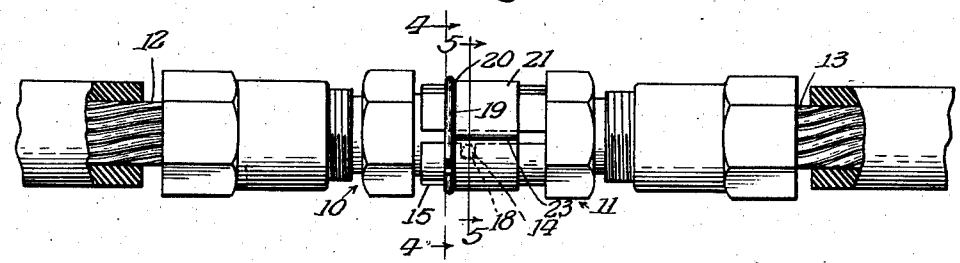
Fig.1
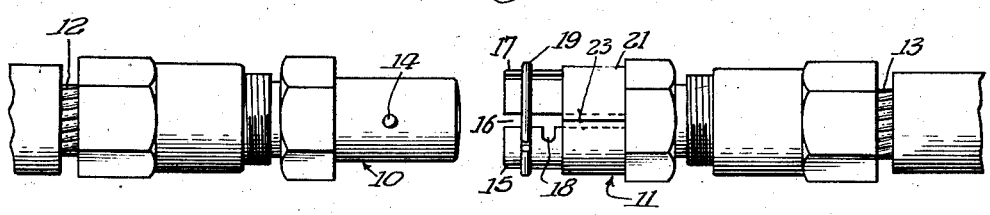
Fig.2
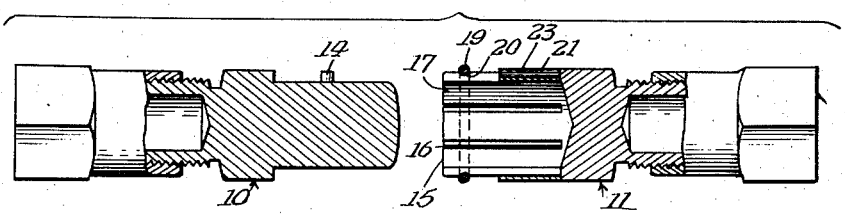
Fig.3
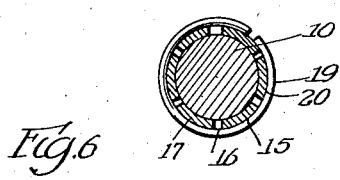
Fig.4　　Fig.5
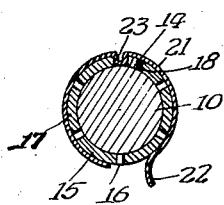
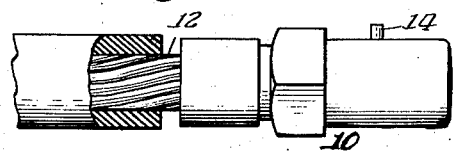
Fig.6
Inventor
Kenneth M. Moody
By Glenn S. Noble
Atty.

Patented Jan. 9, 1945

2,366,747

UNITED STATES PATENT OFFICE 2,366,747

CABLE CONNECTOR

Kenneth M. Moody, Chicago, Ill., assignor of one-half to Glenn S. Noble, Chicago, Ill.

Application July 19, 1943, Serial No. 495,247

2 Claims. (Cl. 287—76)

While this invention may be adapted for various uses, it is particularly directed to connectors or couplings for connecting the ends of electric cables such as used for electric welders or for coupling the cables to some instrument or appliance as, for instance, an electrode or welding rod holder. Electric cables intended for such uses are usually made of relatively small stranded wires, and it is often desirable to connect the ends of sections of such cables in order to provide extensions to make repairs or for other purposes.

In my Patent No. 2,110,421 issued March 8, 1938, I have disclosed a wire connector or coupler for making such connections without the use of solder, but I have found that it is also desirable to provide means whereby the parts may be more quickly coupled and uncoupled, and the present invention provides means for quick acting couplers or connectors preferably embodying the constructions shown in said patent.

The objects of this invention are to provide a quick acting coupler or connector for the purposes described which will be simple in construction and durable and efficient in use.

Other objects are to provide a connector of the bayonet joint type with means for increasing the pressure on the coacting parts, and means for locking or fastening the coupler in connected position; and to provide such other advantages and novel features as will be described more fully hereinafter.

In the accompanying drawing illustrating this invention,

Fig. 1 is a side view showing the present invention as applied to a wire connector of the type disclosed in my patent;

Fig. 2 is a similar view showing the parts in separated or uncoupled relation;

Fig. 3 is a longitudinal sectional view of the parts as shown in Fig. 2, parts being broken away or omitted for convenience in illustration;

Fig. 4 is a cross sectional view taken on the line 4—4 of Fig. 1;

Fig. 5 is a cross sectional view taken on the line 5—5 of Fig. 1; and

Fig. 6 is a modification showing one of the coupler elements connected to the cable by soldering as in the common manner.

As shown in the drawing, the connector includes a male coupling member 10 and female coupling member 11, which members may be secured to the cable ends 12 and 13 by the means shown in my prior patent or by the usual solder connection as shown in Fig. 6. The coupling members provide a bayonet joint connection, the member 10 having a radially extending pin 14 for this purpose. The tubular or hollow portion 15 of the connecting member 11 is intended to fit closely over the plug end of the connector 10 in order to make good electrical contact therewith. These parts are preferably made of copper, brass, or the like, and if used repeatedly, are apt to become worn or distorted so that they do not make good contact. In order to insured continued close engagement of these parts, the cylindrical portion 15 is provided with a plurality of longitudinal slots 16 which extend substantially the full length thereof, thus dividing the cylinder into fingers 17. All of the slots except one are too small to take over or receive the pin 14, but one of the slots is sufficiently wide to receive the same and has a lateral opening or recess 18 for receiving the pin when in fastening position. In other words, this completes the bayonet joint between the parts.

The material of which the fingers are made being such that it does not provide continued or lasting resiliency, I provide a split tension ring 19 which fits over the fingers and engages with a peripheral groove 20 for holding it in position. This spring ring may be made of steel or other suitable material in order to give long service and to provide means for urging fingers into close engagement with the plug portion of the coupling member 10. By means of this arrangement, I provide a slip joint which may be coupled and uncoupled repeatedly, but which will maintain close contact between the parts so that there will be little or no loss through resistance in the joint.

While it is desirable to provide a quick acting coupling, it is also desirable to prevent any accidental or unwarranted uncoupling or a separation of the parts which might be disastrous on account of arcing or on account of the effect produced on the instrument which is being supplied with electricity. To prevent such accidental separation, I provide a split locking sleeve or band 21 which fits closely over the fingers and which has one end turned outwardly to provide a thumbpiece 22. This band also has a rib or projection 23 which extends inwardly into the bayonet joint slot as shown. When the coupling is to be made, the band is moved to retracted position as shown in Fig. 2, or will be shoved to this position by the pin 14 when it moves into the slot 16 to its extreme or fastening position. After the pin is turned into the lateral recess 18, the band 21 is moved toward the ring 19 until the rib or projection 23 closes the open end of the recess 18 and thus locks the pin 14 in its coupling position. The coupling members will thus be held locked in coupling position until the band 21 is again moved out of register with the notch or recess 18 to permit the pin to pass out of the same and into the longitudinal slot.

The thumbpiece 22 is useful in moving the band longitudinally of the fitting and also for adjusting it circumferentially by raising the rib or projection out of the slot, and turning it until the rib rests on one of the fingers. The latter method may be used for locking and unlocking the band, if desired.

From this description taken in connection with my prior patent, it will be seen that I provide means for quickly attaching the male and female connector members to the ends of the cable and also means whereby these connector members or fittings may be quickly connected and disconnected.

Having thus described my invention, what I claim is:

1. A fitting of the bayonet joint type for connecting cables, comprising a plug, a pin extending radially from the plug, a cylindrical member adapted to engage with the plug, said member having longitudinal slits to provide a plurality of resilient fingers and having a slot for receiving the pin, said slot having a lateral recess into which the pin is turned for fastening the parts together, a spring ring around the fingers adjacent to the ends thereof for increasing the pressure of the fingers on the plug, and a locking band slidably mounted on the fingers and having a projection extending inwardly into the slot and adapted to be moved into registry with the lateral recess for holding the pin in fastening position.

2. The combination with a connector of the bayonet joint type for connecting electric cables including a plug having a pin therein and a cylindrical portion having a longitudinal slot for receiving the pin, said slot having a lateral recess into which the pin is moved to fastening position, and a locking band slidably mounted on the cylindrical portion and having an integrally formed projection extending into the slot which closes the opening into the recess when the band is moved to locking position.

KENNETH M. MOODY.